United States Patent
Al-Ismail (10) Patent No.: US 11,290,566 B1
(45) Date of Patent: Mar. 29, 2022

(54) REPLICATING DATA FROM ISOLATED NETWORK

(71) Applicant: Saudi Arabian Oil Company, Dhahran (SA)

(72) Inventor: Adnan M. Al-Ismail, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 43 days.

(21) Appl. No.: 17/035,084

(22) Filed: Sep. 28, 2020

(51) Int. Cl.
*H04L 29/06* (2006.01)
*H04L 67/60* (2022.01)
*H04L 67/101* (2022.01)
*H04L 51/42* (2022.01)
*H04L 67/01* (2022.01)

(52) U.S. Cl.
CPC .............. *H04L 67/32* (2013.01); *H04L 51/22* (2013.01); *H04L 67/101* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 765,758 A | 7/1904 | Votroubek | |
| 8,966,027 B1* | 2/2015 | Brandwine | G06F 9/45533 709/221 |
| 9,641,499 B2* | 5/2017 | Curry | G06F 16/21 |
| 2013/0124465 A1* | 5/2013 | Pingel | G06F 3/0604 707/610 |
| 2015/0277404 A1* | 10/2015 | Maturana | G05B 15/02 700/83 |
| 2021/0336811 A1* | 10/2021 | Mishra | H04L 12/1886 |

* cited by examiner

*Primary Examiner* — Natisha D Cox
(74) *Attorney, Agent, or Firm* — Fish & Richardson P.C.

(57) ABSTRACT

Systems and methods include a computer-implemented method: A number of process information (PI) tags are mapped to data elements of a local PI server of an isolated network. At a first time, a first application is executed at the isolated network to read and concatenate data on the isolated network corresponding to the tags and to replicate the data elements corresponding to temporary storage on the local PI server. A replicated data package is generated by the first application using the temporary storage. The replicated data package is transmissible through a firewall of a corporate network different from the isolated network. At a second time after the first time, a second application is executed at the corporate network to read data elements from the replicated data package corresponding to counterpart tags of the tags and to replicate the data elements according to instructions in the counterpart tags.

20 Claims, 5 Drawing Sheets

○ Day MM/DD/YYYY H:MM PM
Communication @Company.Domain
Action has been taken on Class-1 Valves. } 202

To: Recipients
CC: Copied Recipients...

204 — Red Category

206 — ⓘ You forwarded this message on MM/DD/YYYY

Action Items

The following Class-1 valves have been commissioned SCADA CDS system and they have been automatically configured in SYSTEM X and Corporate PI systems. <u>Please reflect these changes in "Class-1 Valves Stroking Application":</u>

208 {

| Class-1 Valve | Description | Area | Action | Action Time |
|---|---|---|---|---|
| Valve Name | Description/location of Valve | | | MM/DD/YYYY |

FIG. 3

○ Day MM/DD/YYYY H:MM PM
Communication @Company.Domain
Action has been taken on Class-1 Valves. } 202

To: Recipients
CC: Copied Recipients...

The following class-1 valves have been created on the Corporate PI server:

208 {

| Class-1 Valve | Description | Digital Set | Digital Set ID | Point Source |
|---|---|---|---|---|
| Valve Identification 1 | Description/location of Valve 1 | | Digital Set ID 1 | MM/DD/YYYY |
| Valve Identification 2 | Description/location of Valve 2 | | | MM/DD/YYYY |
| Valve Identification 3 | Description/location of Valve 3 | | | MM/DD/YYYY |
| Valve Identification 4 | Description/location of Valve 4 | | Digital Set ID 4 | MM/DD/YYYY |

REPLICATING DATA FROM ISOLATED NETWORK

BACKGROUND

The present disclosure applies to data replication.

Supervisory Control and Data Acquisition (SCADA) systems are critical systems that typically reside in an isolated network (for example, in an isolated plant). Some of the SCADA data may need to be viewed by users who do not have access to the SCADA system, or who want to receive selected SCADA data by email in the corporate network domain. For cybersecurity reasons, the SCADA system may not allow network ports except, for example, a port for a local process information (PI) server.

SUMMARY

The present disclosure describes techniques that can be used for replicating data. In some implementations, a computer-implemented method includes the following. A number of process information (PI) tags are mapped to data elements of a local PI server of an isolated network. At a first time, a first application is executed at the isolated network to read and concatenate data on the isolated network corresponding to the tags and to replicate the data elements corresponding to temporary storage on the local PI server. A replicated data package is generated by the first application using the temporary storage. The replicated data package is transmissible through a firewall of a corporate network different from the isolated network. At a second time after the first time, a second application is executed at the corporate network to read data elements from the replicated data package corresponding to counterpart tags of the tags and to replicate the data elements according to instructions in the counterpart tags.

Techniques can be used to replicate selected field instrumentation live data from an Oil Supply Planning & Scheduling (OSPAS) Supervisory Control and Data Acquisition (SCADA) system in an isolated network to a process information (PI) server in the corporate network. In some implementations, .NET ("Dot Net") console applications and a PI server can be used as a medium to automatically replicate selected critical field instrumentation data. The replicated data can be used by other systems in the corporate network and can be made accessible to authorized users who either do not have access to the SCADA system or need to use the data in other corporate systems. This can enable users to fulfill their business needs as they can use (for example, to view) the replicated data, that is needed, in a desired format and medium. The replication techniques can save time, minimize human errors, and reduce unnecessary human interactions.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/ the instructions stored on the non-transitory, computer-readable medium.

The subject matter described in this specification can be implemented in particular implementations, so as to realize one or more of the following advantages. First, replication techniques can provide flexibility not available in conventional or commercially-available database replication tools. For example, the techniques can provide flexibility in terms of what data is to be replicated. The data to be replicated is not limited to historical data and it can be of any type of user's choice, which PI tags can store. Second, the techniques can provide full control of data-mapping of the selected data to be replicated. For example, the techniques can handle all data-mapping requirements by using two .NET applications that concatenate and parse data before and after replication. This gives more flexibility to replicate data with no restriction imposed by the preset PI Tag configuration. The replication applications can be customized to fit the needs of any business. Third, the techniques can overcome issues with selected PI data that cannot be directly replicated from a PI server to another PI server due to data mapping requirements and data restrictions in the destination PI server. For example, the techniques can overcome the data restrictions by accomplishing the data mapping and data processing using two .NET applications. The techniques can also eliminate the need make modifications to the data before or after replication. Fourth, replication timing and frequency can be controlled through the use of the Windows Task Scheduler. Fifth, replication can occur without the need to make changes to network security, as such security changes could make the network vulnerable to hacking or security breaches. Sixth, the replication techniques can be used by communications departments, operations departments, and real-time system divisions to share data with oil supply planning and scheduling users and power operations department users.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for replicating data. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Figure 1:
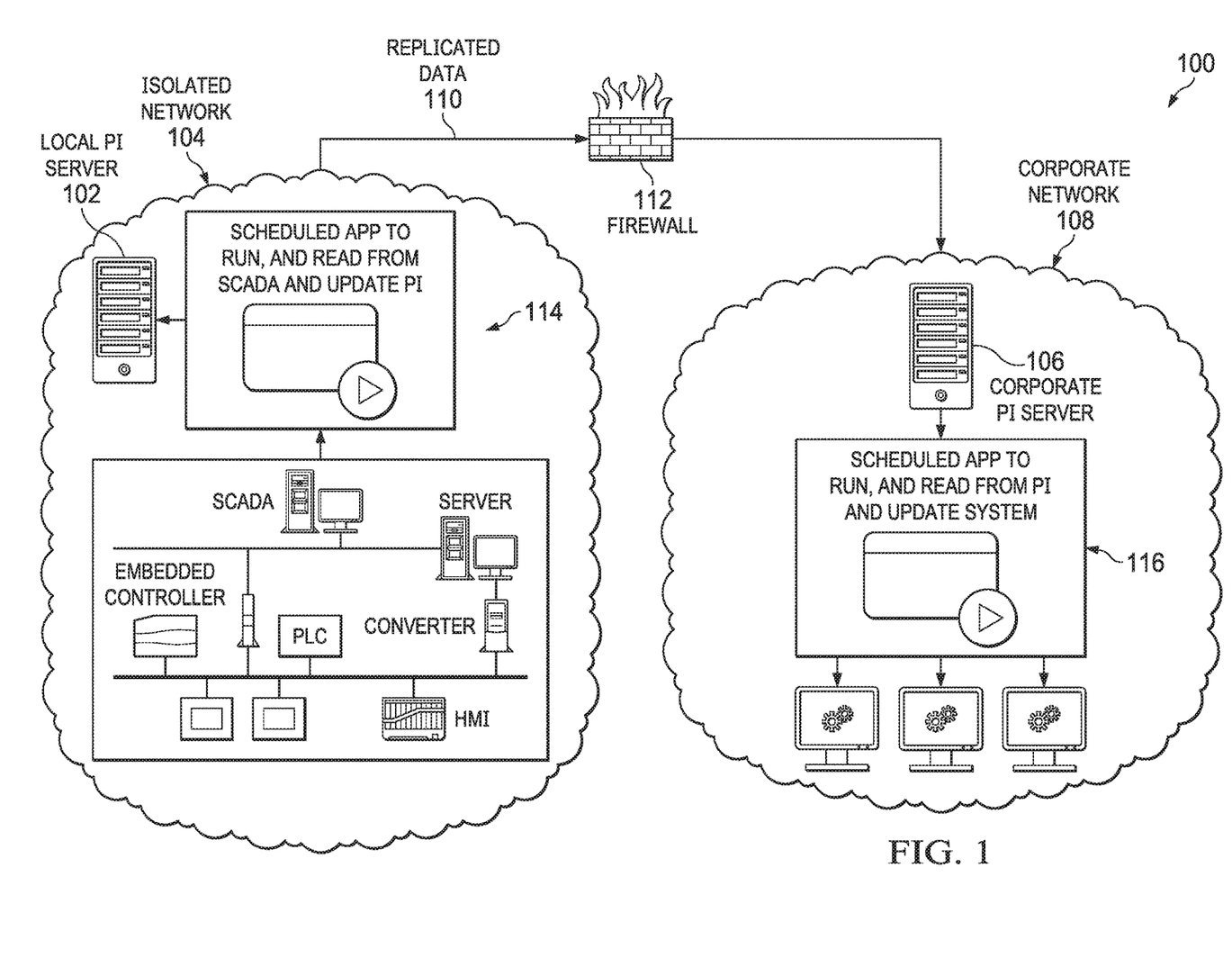
FIG. 1 is a block diagram showing an example of system for performing replication, according to some implementations of the present disclosure.

FIG. 1 is a block diagram showing an example of system 100 for performing replication, according to some implementations of the present disclosure. For example, the system can be used to perform replication from a local process information (PI) server in an isolated network 104 to a corporate PI server 106 in a corporate network 108. The system 100 can create replicated data 110 that is transmittable though a firewall 112 at the corporate network 108.

In some implementations, the system 100 can include two .NET console applications (for example, one each at the local and corporate sides), two PI servers, and an equal number N of PI tags (for example, 50). The PI tags can be created in both the local PI and the corporate PI servers, and allocated for data replication.

The local NET application can run in an isolated network to read SCADA data, concatenate the data, and temporarily store the data in the N allocated PI tags in the local PI server. The data of the N allocated PI tags can be replicated automatically to their counterpart N PI tags in the corporate PI server in the corporate network. The PI tags can be parsed to determine whether to generate a report, send the data by email to one or more users, or to save them into a corporate PI server or a database The corporate .NET application can runs on a server in the corporate network to read the SCADA data of the N allocated PI tags from the corporate PI server. The data read can be processed by the corporate application as needed to meet business needs.

As shown in schedules 114 and 116, for example, the two NET console applications can be scheduled to run as needed, for example, to run during the day through the Windows Task Scheduler. The corporate application can be scheduled (using schedule 116) to run few minutes after the local application has run (using schedule 114).

The two PI servers can include a local PI server and a corporate PI server. The local PI server can run in an isolated network. The local PI server can temporarily hold selected data of SCADA system and automatically replicates the values of the allocated PI tags to the corporate PI server in the corporate network. The corporate PI server can run in the corporate network. The corporate PI server can serve as central PI server to which all local PI servers automatically replicate their PI data.

A number of (for example, N=50) PI tags should be created in both local PI server and corporate PI server and allocated for data replication. The data that needs to be replicated can be concatenated and stored in the allocated PI tags in the local PI server where the data will be replicated to corporate PI server. The number N (for example, 50) of PI tags that are created can be determined based on the amount of data that needs to be replicated.

In an example, there can be a need to replicate class-1 valve data from an isolated SCADA system to the corporate PI in a corporate network. In this example, the Windows Task Scheduler tool can be used to run a .NET console application on a regular schedule (for example, twice each day). The console application in the isolated network can detect all newly created/deleted class-1 valve tags. Then, the console application can access and collect all the data pertaining to class-1 valves, concatenate the valve data, and save the data into 50 PI tags which are allocated for data replication. The allocated PI tags can be configured to replicate their values automatically to their counterpart 50 allocated PI tags in the corporate PI server.

The .NET console application which runs on a server in the corporate network can be scheduled to run few minutes after the application in the isolated network has run. The console application will read the replicated Class-1 valve data from the 50 allocated PI tags in the corporate PI server, parse the data, and make all the necessary changes to the data such as mapping data and create them into the corporate PI server. Then, email messages can be sent to concerned users to make them aware of the newly-created or deleted class-1 valves.

Figure 2:
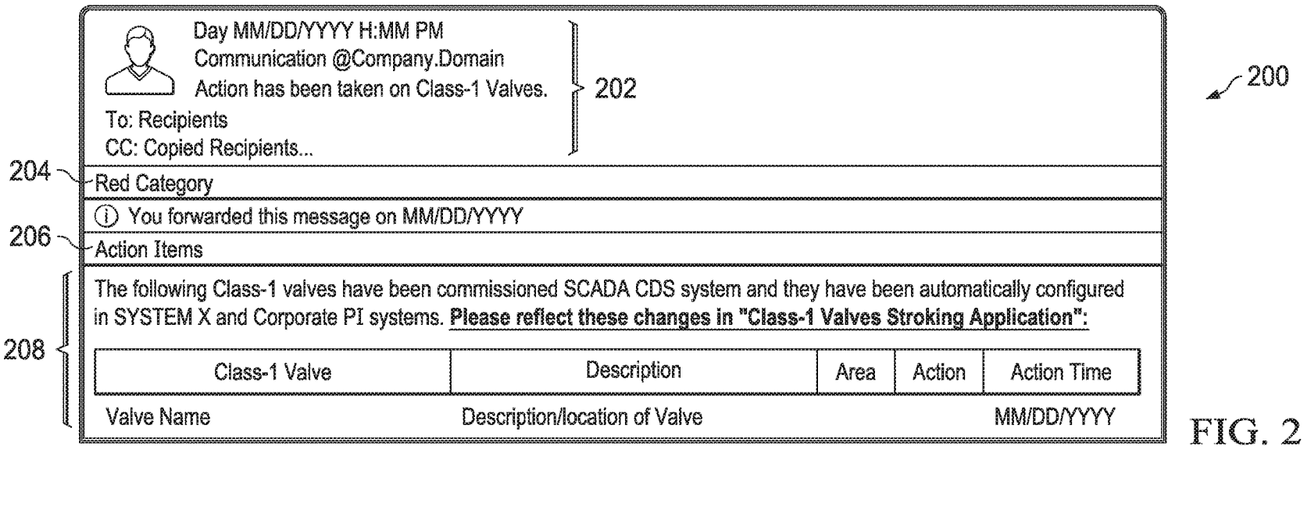
FIGS. 2-4 are screen shots showing examples of emails that are sent to the users, according to some implementations of the present disclosure.
Figure 3:
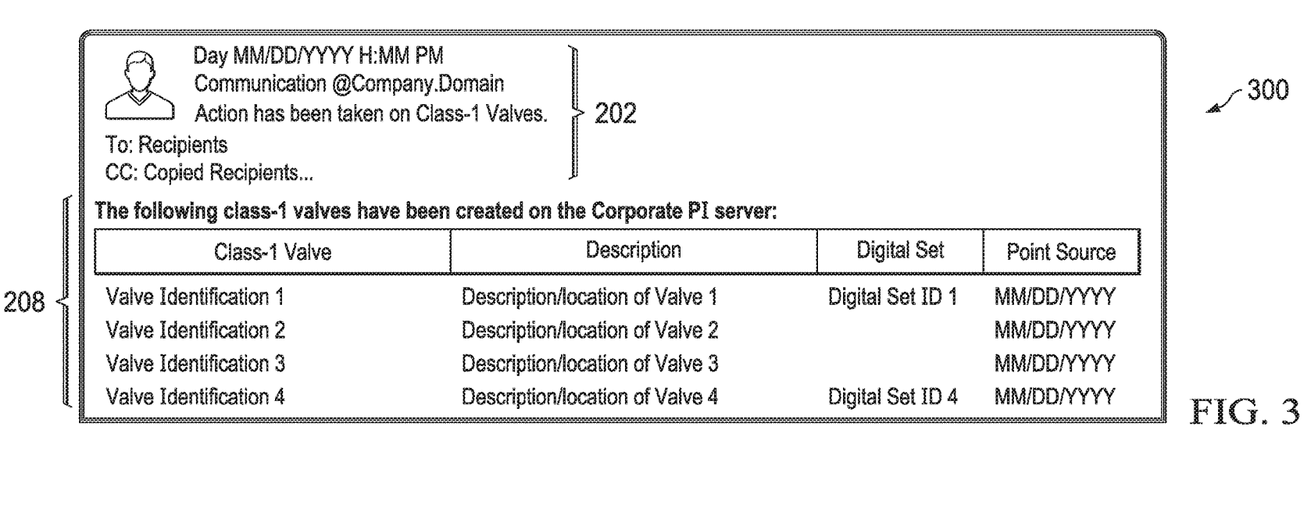
Figure 4:
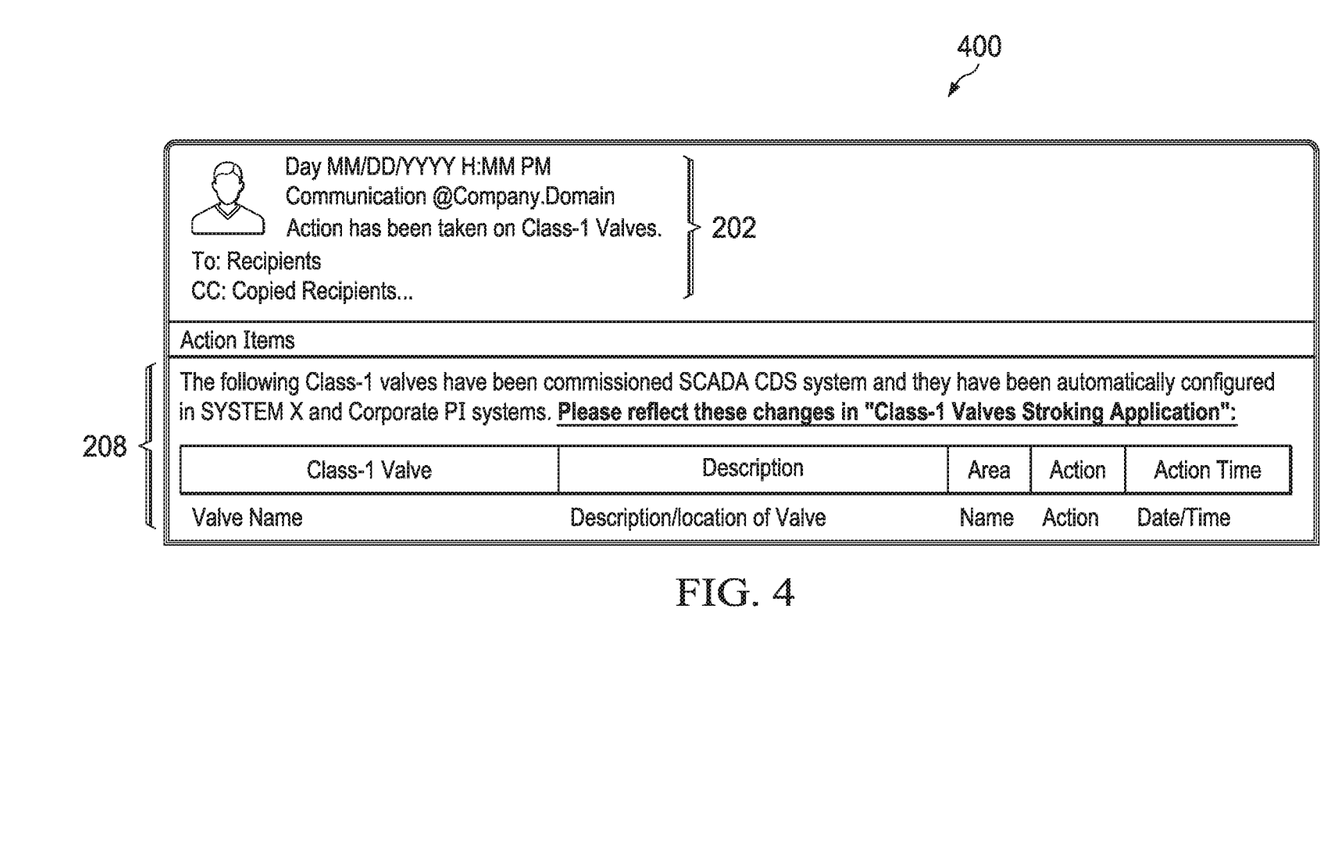

FIGS. 2-4 are screen shots showing examples of emails that are sent to the users, according to some implementations of the present disclosure. Referring to FIG. 2, screenshot 200 includes a header 202 providing date/time/subject information of the email and listing recipients of the email. A category 204 can identify a category associated with the email (for example, a red category being a highest category). The email can include an action items header 206. The body of the email can identify status information 208, for example, regarding specific valves.

Figure 5:
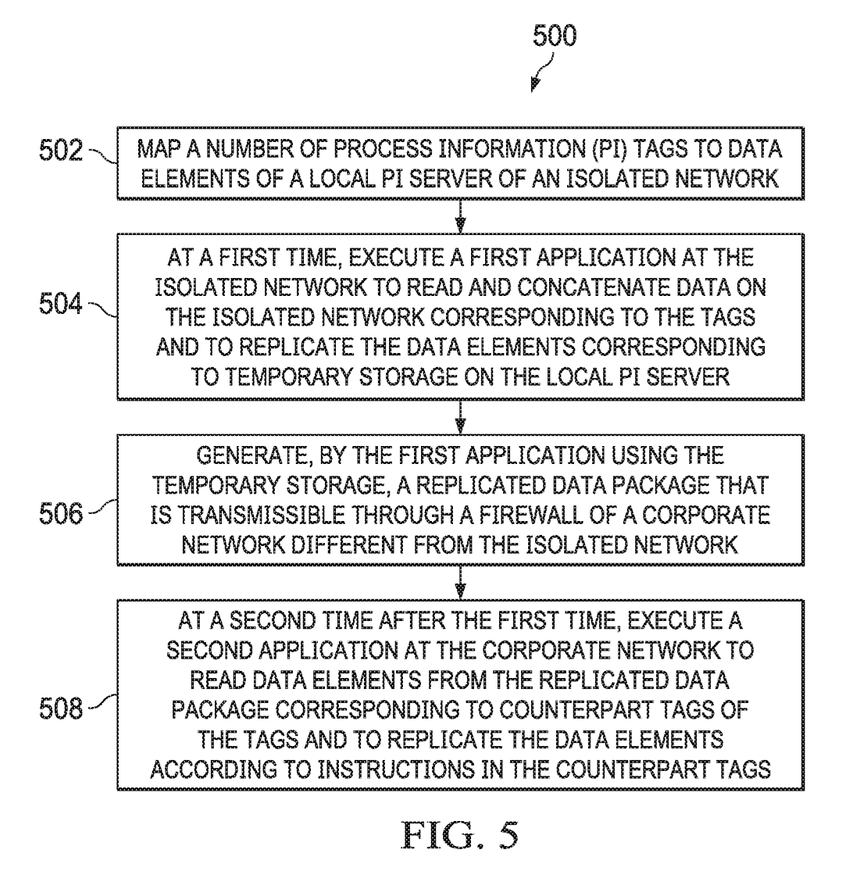
FIG. 5 is a flowchart of an example of a method for replicating data, according to some implementations of the present disclosure.

FIG. 5 is a flowchart of an example of a method 500 for replicating data, according to some implementations of the present disclosure. For clarity of presentation, the description that follows generally describes method 500 in the context of the other figures in this description. However, it will be understood that method 500 can be performed, for example, by any suitable system, environment, software, and hardware, or a combination of systems, environments, software, and hardware, as appropriate. In some implementations, various steps of method 500 can be run in parallel, in combination, in loops, or in any order.

At 502, a number of process information (PI) tags are mapped to data elements of a local PI server of an isolated network. From 502, method 500 proceeds to 504.

At 504, at a first time, a first application is executed at the isolated network to read and concatenate data on the isolated network corresponding to the tags and to replicate the data elements corresponding to temporary storage on the local PI server. From 504, method 500 proceeds to 506.

At 506, a replicated data package is generated by the first application using the temporary storage. The replicated data package is transmissible through a firewall of a corporate network different from the isolated network. From 506, method 500 proceeds to 508.

At 508, at a second time after the first time, a second application is executed at the corporate network to read data elements from the replicated data package corresponding to counterpart tags of the tags and to replicate the data elements according to instructions in the counterpart tags. After 508, method 500 can stop.

In some implementations, method 500 further includes scheduling, using a scheduling application, the first time and the second time.

Figure 6:
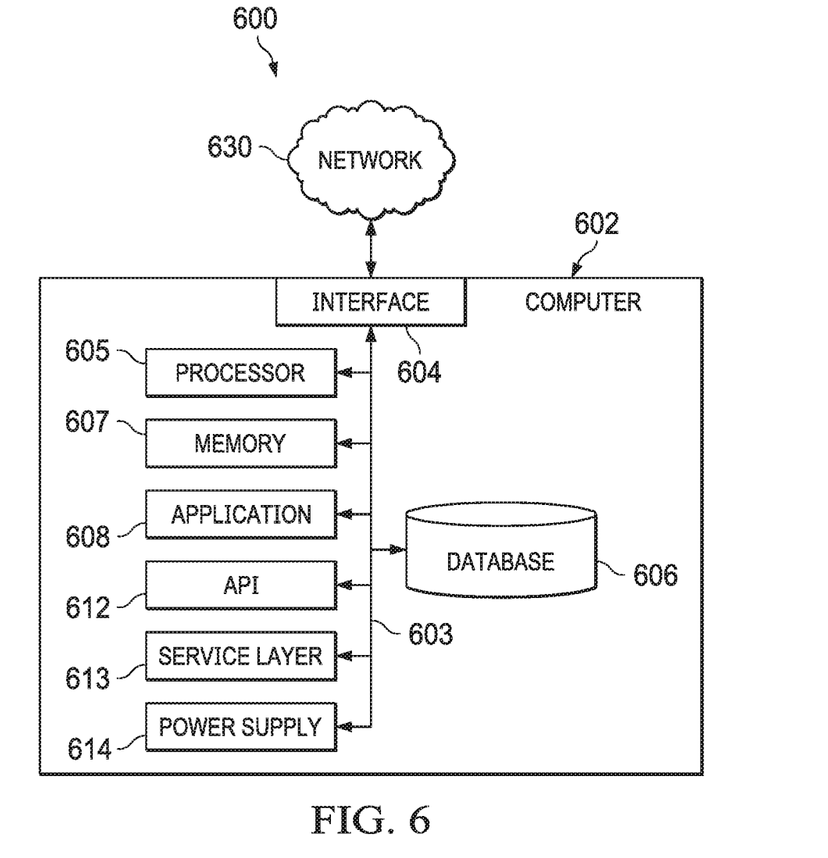
FIG. 6 is a block diagram illustrating an example computer system used to provide computational functionalities associated with described algorithms, methods, functions, processes, flows, and procedures as described in the present disclosure, according to some implementations of the present disclosure.

FIG. 6 is a block diagram of an example computer system 600 used to provide computational functionalities associated with described algorithms, methods, functions, processes, flows, and procedures described in the present disclosure, according to some implementations of the present disclosure. The illustrated computer 602 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI).

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a top level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus 603. In some implementations, any or all of the components of the computer 602, including hardware or software components, can interface with each other or the interface 604 (or a combination of both) over the system bus 603. Interfaces can use an application programming interface (API) 612, a service layer 613, or a combination of the API 612 and service layer 613. The API 612 can include specifications for routines, data structures, and object classes. The API 612 can be either computer-language independent or dependent. The API 612 can refer to a complete interface, a single function, or a set of APIs.

The service layer 613 can provide software services to the computer 602 and other components (whether illustrated or not) that are communicably coupled to the computer 602. The functionality of the computer 602 can be accessible for all service consumers using this service layer. Software services, such as those provided by the service layer 613, can provide reusable, defined functionalities through a defined interface. For example, the interface can be software written in JAVA, C++, or a language providing data in extensible markup language (XML) format. While illustrated as an integrated component of the computer 602, in alternative implementations, the API 612 or the service layer 613 can be stand-alone components in relation to other components of the computer 602 and other components communicably coupled to the computer 602. Moreover, any or all parts of the API 612 or the service layer 613 can be implemented as child or sub-modules of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 also includes a database 606 that can hold data for the computer 602 and other components connected to the network 630 (whether illustrated or not). For example, database 606 can be an in-memory, conventional, or a database storing data consistent with the present disclosure. In some implementations, database 606 can be a combination of two or more different database types (for example, hybrid in-memory and conventional databases) according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

The application 608 can be an algorithmic software engine providing functionality according to particular needs, desires, or particular implementations of the computer 602 and the described functionality. For example, application 608 can serve as one or more components, modules, or applications. Further, although illustrated as a single application 608, the application 608 can be implemented as multiple applications 608 on the computer 602. In addition, although illustrated as internal to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power supply 614 can include a power plug to allow the computer 602 to be plugged into a wall socket or a power source to, for example, power the computer 602 or recharge a rechargeable battery.

There can be any number of computers 602 associated with, or external to, a computer system containing computer 602, with each computer 602 communicating over network 630. Further, the terms "client," "user," and other appropriate terminology can be used interchangeably, as appropriate, without departing from the scope of the present disclosure. Moreover, the present disclosure contemplates that many users can use one computer 602 and one user can use multiple computers 602.

Described implementations of the subject matter can include one or more features, alone or in combination.

For example, in a first implementation, a computer-implemented method includes the following. A number of process information (PI) tags are mapped to data elements of a local PI server of an isolated network. At a first time, a first application is executed at the isolated network to read and concatenate data on the isolated network corresponding to the tags and to replicate the data elements corresponding to temporary storage on the local PI server. A replicated data package is generated by the first application using the temporary storage. The replicated data package is transmissible through a firewall of a corporate network different from the isolated network. At a second time after the first time, a second application is executed at the corporate network to read data elements from the replicated data package corresponding to counterpart tags of the tags and to replicate the data elements according to instructions in the counterpart tags.

The foregoing and other described implementations can each, optionally, include one or more of the following features:

A first feature, combinable with any of the following features, where the PI tags identify the data to be replicated and identify the recipient's desired format of the data.

A second feature, combinable with any of the previous or following features, where the recipient's desired format of the data includes generating a report.

A third feature, combinable with any of the previous or following features, where the recipient's desired format of the data includes sending the data by email to one or more users.

A fourth feature, combinable with any of the previous or following features, where the recipient's desired format of the data includes saving the data into a corporate PI server or a database.

A fifth feature, combinable with any of the previous or following features, where the method further includes scheduling, using a scheduling application, the first time and the second time.

A sixth feature, combinable with any of the previous or following features, where replicating the data elements according to the instructions in the counterpart tags includes one or more of generating a report, sending the data by email to one or more users, or to save the data into a corporate PI server or database.

In a second implementation, a computer-implemented system includes a local process information (PI) server of an isolated network, a corporate network different from the isolated network, one or more processors, and a non-transitory computer-readable storage medium coupled to the one or more processors and storing programming instructions for execution by the one or more processors. The programming instructions instruct the one or more processors to perform operations that include the following. A number of PI tags are mapped to data elements of the local PI server. At a first time, a first application is executed at the isolated network to read and concatenate data on the isolated network corresponding to the tags and to replicate the data elements corresponding to temporary storage on the local PI server. A replicated data package that is transmissible through a firewall of the corporate network is generated by the first application using the temporary storage. At a second time after the first time, a second application is executed at the corporate network to read data elements from the replicated data package corresponding to counterpart tags of the tags and to replicate the data elements according to instructions in the counterpart tags.

The foregoing and other described implementations can each, optionally, include one or more of the following features:

A first feature, combinable with any of the following features, where the PI tags identify the data to be replicated and identify the recipient's desired format of the data.

A second feature, combinable with any of the previous or following features, where the recipient's desired format of the data includes generating a report.

A third feature, combinable with any of the previous or following features, where the recipient's desired format of the data includes sending the data by email to one or more users.

A fourth feature, combinable with any of the previous or following features, where the recipient's desired format of the data includes saving the data into a corporate PI server or a database.

A fifth feature, combinable with any of the previous or following features, where the method further includes scheduling, using a scheduling application, the first time and the second time.

A sixth feature, combinable with any of the previous or following features, where replicating the data elements according to the instructions in the counterpart tags includes one or more of generating a report, sending the data by email to one or more users, or to save the data into a corporate PI server or database.

In a third implementation, a non-transitory, computer-readable medium stores one or more instructions executable by a computer system to perform operations including the following. A number of process information (PI) tags are mapped to data elements of a local PI server of an isolated network. At a first time, a first application is executed at the isolated network to read and concatenate data on the isolated network corresponding to the tags and to replicate the data elements corresponding to temporary storage on the local PI server. A replicated data package is generated by the first application using the temporary storage. The replicated data package is transmissible through a firewall of a corporate network different from the isolated network. At a second time after the first time, a second application is executed at the corporate network to read data elements from the replicated data package corresponding to counterpart tags of the tags and to replicate the data elements according to instructions in the counterpart tags.

The foregoing and other described implementations can each, optionally, include one or more of the following features:

A first feature, combinable with any of the following features, where the PI tags identify the data to be replicated and identify the recipient's desired format of the data.

A second feature, combinable with any of the previous or following features, where the recipient's desired format of the data includes generating a report.

A third feature, combinable with any of the previous or following features, where the recipient's desired format of the data includes sending the data by email to one or more users.

A fourth feature, combinable with any of the previous or following features, where the recipient's desired format of the data includes saving the data into a corporate PI server or a database.

A fifth feature, combinable with any of the previous or following features, where the method further includes scheduling, using a scheduling application, the first time and the second time.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
    mapping a number of process information (PI) tags to data elements of a local PI server of an isolated network;
    at a first time, executing a first application at the isolated network to read and concatenate data on the isolated network corresponding to the tags and to replicate the data elements corresponding to temporary storage on the local PI server;
    generating, by the first application using the temporary storage, a replicated data package that is transmissible through a firewall of a corporate network different from the isolated network; and
    at a second time after the first time, executing a second application at the corporate network to read data elements from the replicated data package corresponding to counterpart tags of the tags and to replicate the data elements according to instructions in the counterpart tags.

2. The computer-implemented method of claim 1, wherein the PI tags identify the data to be replicated and identify the recipient's desired format of the data.

3. The computer-implemented method of claim 2, wherein the recipient's desired format of the data includes generating a report.

4. The computer-implemented method of claim 2, wherein the recipient's desired format of the data includes sending the data by email to one or more users.

5. The computer-implemented method of claim 2, wherein the recipient's desired format of the data includes saving the data into a corporate PI server or a database.

6. The computer-implemented method of claim 1, further comprising scheduling, using a scheduling application, the first time and the second time.

7. The computer-implemented method of claim 1, wherein replicating the data elements according to the instructions in the counterpart tags includes one or more of generating a report, sending the data by email to one or more users, or to save the data into a corporate PI server or database.

8. A computer-implemented system, comprising:
    a local process information (PI) server of an isolated network;
    a corporate network different from the isolated network;
    one or more processors; and
    a non-transitory computer-readable storage medium coupled to the one or more processors and storing programming instructions for execution by the one or more processors, the programming instructions instructing the one or more processors to perform operations comprising:
        mapping a number of PI tags to data elements of the local PI server;
        at a first time, executing a first application at the isolated network to read and concatenate data on the isolated network corresponding to the tags and to replicate the data elements corresponding to temporary storage on the local PI server;
        generating, by the first application using the temporary storage, a replicated data package that is transmissible through a firewall of the corporate network; and
        at a second time after the first time, executing a second application at the corporate network to read data elements from the replicated data package corresponding to counterpart tags of the tags and to replicate the data elements according to instructions in the counterpart tags.

9. The computer-implemented system of claim 8, wherein the PI tags identify the data to be replicated and identify the recipient's desired format of the data.

10. The computer-implemented system of claim 9, wherein the recipient's desired format of the data includes generating a report.

11. The computer-implemented system of claim 9, wherein the recipient's desired format of the data includes sending the data by email to one or more users.

12. The computer-implemented system of claim 9, wherein the recipient's desired format of the data includes saving the data into a corporate PI server or a database.

13. The computer-implemented system of claim 8, the operations further comprising scheduling, using a scheduling application, the first time and the second time.

14. The computer-implemented system of claim 8, wherein replicating the data elements according to the instructions in the counterpart tags includes one or more of generating a report, sending the data by email to one or more users, or to save the data into a corporate PI server or database.

15. A non-transitory, computer-readable medium storing one or more instructions executable by a computer system to perform operations comprising:
    mapping a number of process information (PI) tags to data elements of a local PI server of an isolated network;
    at a first time, executing a first application at the isolated network to read and concatenate data on the isolated network corresponding to the tags and to replicate the data elements corresponding to temporary storage on the local PI server;
    generating, by the first application using the temporary storage, a replicated data package that is transmissible through a firewall of a corporate network different from the isolated network; and
    at a second time after the first time, executing a second application at the corporate network to read data elements from the replicated data package corresponding to counterpart tags of the tags and to replicate the data elements according to instructions in the counterpart tags.

16. The non-transitory, computer-readable medium of claim 15, wherein the PI tags identify the data to be replicated and identify the recipient's desired format of the data.

17. The non-transitory, computer-readable medium of claim 16, wherein the recipient's desired format of the data includes generating a report.

18. The non-transitory, computer-readable medium of claim 16, wherein the recipient's desired format of the data includes sending the data by email to one or more users.

19. The non-transitory, computer-readable medium of claim 16, wherein the recipient's desired format of the data includes saving the data into a corporate PI server or a database.

20. The non-transitory, computer-readable medium of claim 15, the operations further comprising scheduling, using a scheduling application, the first time and the second time.

\* \* \* \* \*